United States Patent [19]

Bell, Jr.

[11] Patent Number: 4,733,043

[45] Date of Patent: Mar. 22, 1988

[54] RAM STABILIZING CIRCUIT FOR ELECTRICAL DISCHARGE MACHINE

[75] Inventor: Oliver A. Bell, Jr., Statesville, N.C.

[73] Assignee: Colt Industries Inc., New York, N.Y.

[21] Appl. No.: 800,686

[22] Filed: Nov. 22, 1985

[51] Int. Cl.[4] .......................... B23H 1/02; B23H 7/32
[52] U.S. Cl. .................................. 219/69 G
[58] Field of Search ........................... 219/69 G, 69 C; 318/569, 570, 603; 204/129.5

[56] References Cited

U.S. PATENT DOCUMENTS

| | | | |
|---|---|---|---|
| 3,665,170 | 5/1972 | Bakel et al. | 318/569 |
| 4,160,200 | 7/1979 | Imamura et al. | 318/616 |
| 4,238,660 | 12/1980 | Bell, Jr. et al. | 219/69 G |
| 4,315,199 | 2/1982 | Kyomasu et al. | 318/603 |
| 4,320,278 | 3/1982 | Bell, Jr. et al. | 219/69 C |
| 4,409,942 | 9/1983 | Balleys et al. | 219/69 G |
| 4,458,190 | 7/1984 | Takawashi et al. | 219/69 C |
| 4,475,025 | 10/1984 | Sutton et al. | 219/69 C |
| 4,484,287 | 11/1984 | Gamo et al. | 219/69 C |

FOREIGN PATENT DOCUMENTS 60-71125  4/1985  Japan ................. 219/69 G

*Primary Examiner*—A. D. Pellinen
*Assistant Examiner*—Geoffrey S. Evans
*Attorney, Agent, or Firm*—Harry R. Dumont

[57] ABSTRACT

A closed loop servo feed system for an EDM ram. A gap voltage signal is processed to control the servo feed operation with respect to ram velocity and also ram direction. A first network is provided with a voltage to frequency section for controlling ram velocity. A second network includes a raise/lower ram section with a comparator to determine the direction of ram movement.

8 Claims, 2 Drawing Figures

RAM STABILIZING CIRCUIT FOR ELECTRICAL DISCHARGE MACHINE

TECHNICAL FIELD

This machine relates to a servo feed system in which the ram cutting action has been improved by smoothing out the servo motor operation.

BACKGROUND ART

The field to which this invention relates is known as Electrical Discharge Machining, hereinafter sometimes referred to as EDM, in which material is removed from an electrically conductive workpiece by the action of the electrical discharges passing between a tool electrodes and the work. A dielectric liquid coolant is circulated through the machining gap which is maintained between the electrode tool and the workpiece during machining operation. A servo feed system is included to provide for relative movement between the workpiece and the electrode tool to maintain optimum gap spacing as workpiece material is progressively removed. In the EDM operation, the electrode is always maintained in spaced relationship with the workpiece.

In order to conduct electrical discharge machining with reliable and predictable results, an electrical discharge machining circuit of the independent pulse generator type is preferably used to provide machining power pulses of precisely controllable frequency and on/off time. In a particular type of EDM circuit, the pulse generator may be embodied as a multivibrator, oscillator or the like. One type of pulse generator suitable for use in conjunction with this invention is shown and described in U.S. Pat. No. 3,854,026 issued on Dec. 4, 1974 to Oliver A. Bell, Jr. et al for "GATED TIMING SYSTEM FOR ELECTRICAL DISCHARGE MACHINING", which patent is of common ownership with the present application. A servo feed system for electrical discharge machining is shown and described in U.S. Pat. No. 3,727,024 issued on Apr. 10, 1973 to Oliver A. Bell for "ELECTRICAL DISCHARGE MACHINING SERVO CONTROL CIRCUIT" also of common ownership herewith. The present invention represents an advancement in a feed system in which the servo feed circuit is stabilized in its operation.

DISCLOSURE OF THE INVENTION

The present invention relates to a servo feed system for an FDM ram which is typically mounted in a vertical position. Gap voltage signals are processed to control the servo feed operation with respect to the velocity of ram movement and also the direction of ram movement. In prior art servo systems, gap voltage signals after being processed, are supplied to the terminals of a servo feed motor to control the up and down movement of the ram in an effort to hold the gap relatively constant in size as machining progresses. A number of factors are present in EDM operation that contribute to the instability of the servo feed. For example, the gap becomes plugged up or contaminated with detritus, gas or other impurities that are created because of the high energy discharges in the gap. The present invention provides a stabilized servo system in which the servo feed signal is processed in two networks. The first of these is a frequency generator section and the second is a raise/lower ram section in which the direction of ram movement is controlled. The frequency generator section includes an absolute value circuit and finally a voltage to frequency circuit. A second raise/lower ram section includes a comparator which decides whether the ram should move upwardly or downwardly. If the gap voltage were greater than zero, the ram would be moved up. If it were less than zero, It would be moved down.

There is then provided a binary up/down counter. With a high input, there would be a count down operation of the counter. If there were a low input, it would be counted up. The frequency is tapped off from the up/down counter with the frequency output one half of the input frequency received from the voltage to frequency converter. There are then two phase outputs which are passed through and exclusive "or" gate then through an open collector buffer and to the CNC which itself controls final ram movement upwardly and downwardly and with respect to its frequency. In the usual manner, well known in the electronic art, these signal outputs control the CNC signals to move the ram up and down. It is thus an object of this invention to provide EDM operations with a stable and reliable servo feed operation of the ram.

BRIEF DESCRIPTION OF THE DRAWINGS

Reference is made to the appended specification which explains the present invention and to the drawings in which like numerals and letters are used to refer to like elements which are shown throughout the several drawings, and wherein.

BEST MODE OF CARRYING OUT THE INVENTION

Figure 1:
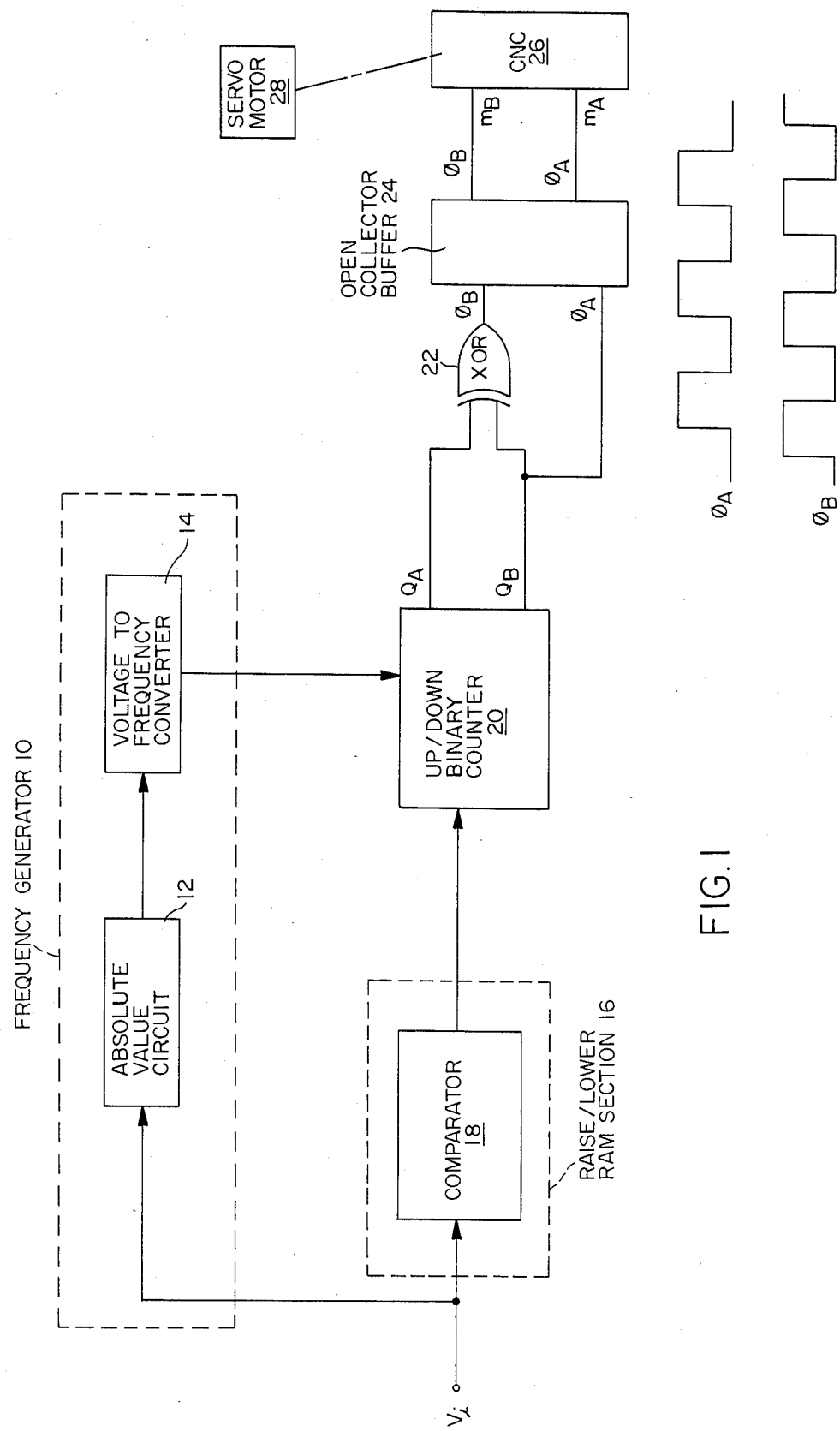
FIG. 1 is a combined schematic and block diagrammatic drawing of an EDM servo control system.

FIG. 1 shows the servo system in which the gap servo voltage Vi is shown at the left hand of the circuit. At the upper portion of the circuit, there is included a frequency generator 10 that includes an absolute value circuit 12 and a voltage to frequency converter 14 for processing the servo input and controlling the speed of operation of the system.

The servo voltage input Vi is also provided to a raise/lower ram section 16 that includes a comparator 18 which decides the direction of movement of the servo ram. For example, if the voltage input were greater than zero, the output of the comparator would be equal to zero. If the input is less than zero, the voltage output would be five volts. The up and down signal from the comparator 18 is passed as an input to an up/down binary counter 20 which also receives an input from the voltage to frequency converter 14. The up/down binary counter 20 responsive to a high input would count down. Responsive to a low input, it would count up. The velocity of servo operation is controlled by the frequency of the output from the voltage to frequency converter 14.

Also included in the FIG. 1 drawing is an exclusive "or" gate 22 whose output is passed to an open collector buffer stage 24 and finally provided as a control input to the CNC 26 for controlling servo operation of the machine. FIG. 1 includes a voltage waveform diagram at its lower right hand end showing the outputs that are passed on to the CNC. These include $\phi A$ and $\phi B$ which have the same frequency but a phase displaced relationship of 90 degrees as shown. The φA and φB outputs from the up/down binary counter 20 are offset by the gate 22 for providing the φA and φB signals in their phase displaced relationship. After passing these signals through an open collector buffer stage 24, they are passed on to the CNC 26 of the machine which in turn gives the signals to operate the servo motor 28 and move the EDM ram up and down.

Figure 2:
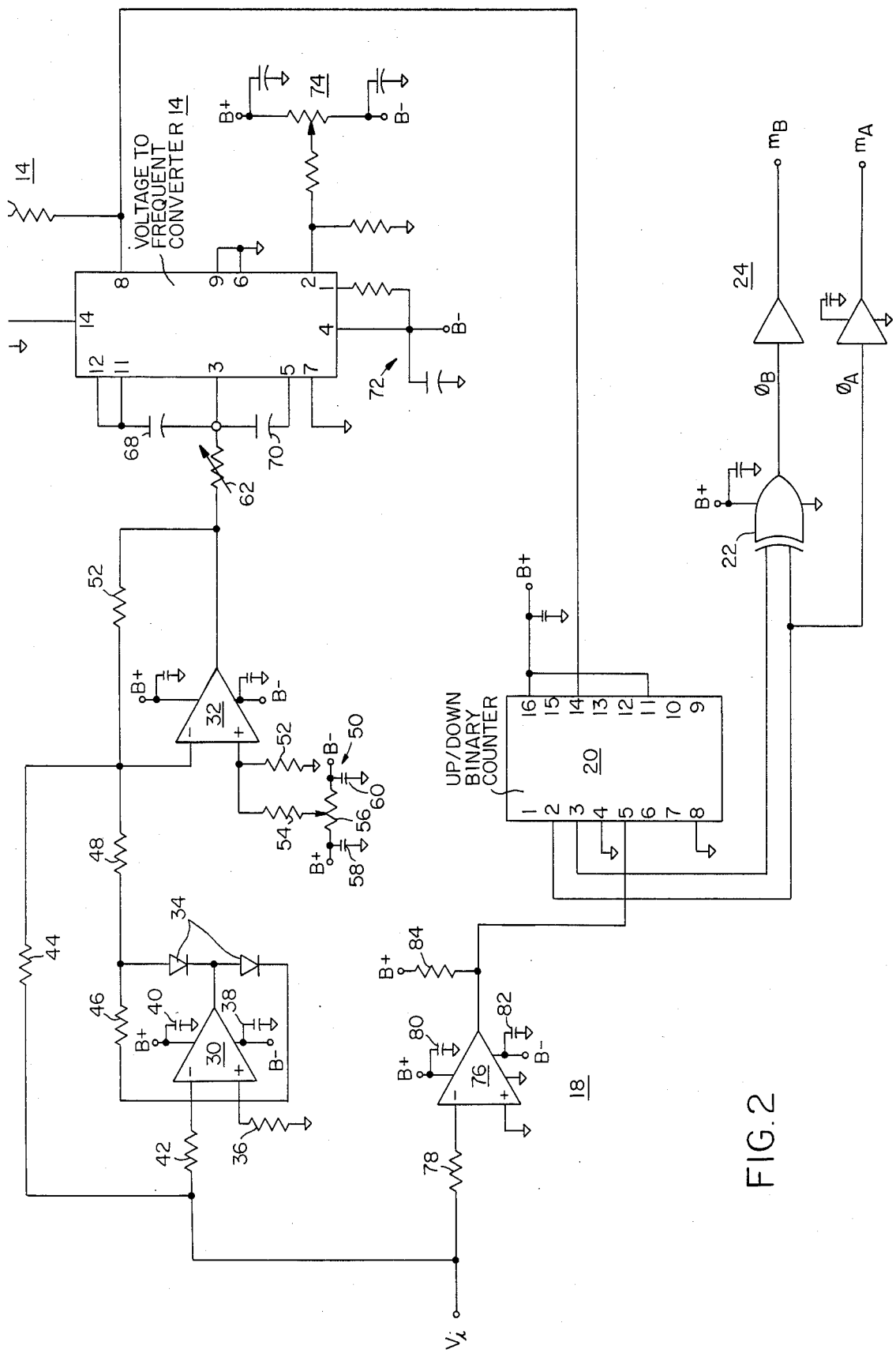
FIG. 2 is a detailed schematic drawing showing the arrangement of elements in the servo control system in FIG. 1.

In FIG. 2, circuit 12 includes a pair of amplifiers 30 and 32. The amplifier 30 has connected to its output a pair of diodes 34 poled as shown. Also connected to the amplifier 30 is a time constant network comprising a resistor 36 and a capacitor 38. Necessary bias voltages are connected as shown and also further timing capacitor 40. The signal is passed to the amplifier 30 through a series resistor 42 and a resistor network including resistors 44, 46 and 48 are connected in circuit. The output from the amplifier 30 is passed to the negative input terminal of the amplifier 32. An offset adjust circuit 50 is connected to the positive input terminal of the amplifier 32 and includes resistors 52, 54 and a potentiometer 56. Capacitors 58 and 60 are connected in circuit together with the necessary bias voltage sources.

The amplifier 32 is shunted by resistor 62 and the output of the amplifier 32 is passed through a variable resistor 62 as an input to the next voltage to frequency converter 14. The output of the absolute value circuit is the same as the input if Vi is positive and the negative of the signal Vi if Vi is negative. The absolute value circuit is required in the system since the voltage to frequency converter 14 can operate only with positive voltages. Next, the output is fed into the voltage to frequency converter 14. The voltage to frequency converter 14 has an external timing network inclucing capacitor 64 and resistor 66. Capacitors 68 and 70 are further connected to the network. It is the function of the voltage to frequency converter to generate a square wave clock signal which serves as an input to the up/down binary counter 20. The external RC. networks 72 and 74 are connected to the voltage frequency converter 14 to allow for setting the operating parameters.

The signal Vi is also passed to an amplifier 76 via series resistor 78 in the raise/lower ram section 18. External bias voltages and capacitors 80, 82 and resistor 84 are connected in circuit.

The signal output from the amplifier 76 decides whether to raise or lower the ram by controlling the phase of the MB pulse. If Vi is >0 then the comparator 18 generates a 0 volt output which directs the counter 20 to count up. If Vi is <0 then the comparator 18 outputs a digital "1" signal and tells the counter 20 to count down and thus invert MB.

Both the outputs of the voltage to frequency converter stage 14 and the binary raise/lower ram section 18 are inputs to the up/down binary counter 20. The two outputs of th ecounter that are used are the QA signal which is one half of the input clock frequency and QB signal which is one quarter of the input clock frequency. The QA and QB outputs are now input into the exclusive "or" gate 22. The output of this gate is a square wave 90 degrees out of phase with QB but with the same frequency as QB. QB also called φA, is the MA input into the CNC as shown in FIG. 1. The output of the exclusive "or" gate 22 is the 90 degrees shifted signal called φB which leads into the MB of the input of the CNC. The two clock signals are fed into a buffer with open collector outputs as required by the CNC. The CNC 26 controls the output of the servo motor 28 as shown in FIG. 1.

It will thus be seen by my invention I have provided an improved EDM cutting action by taking a gap signal output from the gap and feeding this voltage signal into a circuit to generate two clock signals. One of the two clock signals determines how fast the ram moves. Depending on the phase relationship of the two signals, there is a control over which way the ram move either up or down. The clock outputs are fed into the CNC thus to control the actual servo motor action. The resulting system is a closed loop system which makes certain that the electrode is cutting with a constant current and voltage. The new system further improves cutting action over prior art systems by making the response time quicker in the closed loop.

What is claimed is:

1. A servo feed system for an electrical discharge machining apparatus for machining an electrically conductive workpiece by an electrode carrying ram across a dielectric filled gap, comprising:
   an electrical servo feed motor operatively connected to said ram;
   means connected to the gap for providing a gap voltage signal;
   a first network connected to said signal for generating a first clock signal representative of ram velocity;
   a second network connected to said signal for generating a second clock signal phase displaced from said first clock signal and representative of ram direction of movement; and
   means for combining said signals to provide a control output for said servo feed motor.

2. The improvement of claim 1, wherein said first network includes a voltage to frequency converter.

3. The improvement of claim 1, wherein said first network includes an absolute value circuit and a voltage to frequency converter.

4. The improvement of claim 1, wherein said second network includes a comparator stage for comparing said gap voltage signal to zero.

5. The combination as set forth in claim 1, wherein said control output comprises a pair of phase displaced signals of variable frequencies.

6. The improvement of claim 1, wherein said combining means includes an up/down binary counter connected to the respective outputs of said networks.

7. The improvement of claim 1, wherein said combining means includes an exclusive "or" gate.

8. The improvement of claim 1, wherein a CNC is connected between said combining means and said servo feed motor for controlling said motor.

* * * * *